United States Patent
Suzuki et al.

(10) Patent No.: US 11,519,349 B2
(45) Date of Patent: Dec. 6, 2022

(54) CONTROL SYSTEM OF VEHICLE

(71) Applicant: TOYOTA JIDOSHA KABUSHIKI KAISHA, Toyota (JP)

(72) Inventors: Takashi Suzuki, Miyoshi (JP); Akihiro Kaneko, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/567,774

(22) Filed: Jan. 3, 2022

(65) Prior Publication Data

US 2022/0220912 A1    Jul. 14, 2022

(30) Foreign Application Priority Data

Jan. 8, 2021  (JP) .............................. JP2021-002106

(51) Int. Cl.
  *F02D 41/02*  (2006.01)
  *B60W 10/06*  (2006.01)
  (Continued)

(52) U.S. Cl.
  CPC .......... *F02D 41/023* (2013.01); *B60W 10/06* (2013.01); *B60W 10/08* (2013.01); *B60W 20/30* (2013.01);
  (Continued)

(58) Field of Classification Search
  CPC ............... F02D 41/023; F02D 2250/14; F02D 2250/28; F02D 2041/286; F02D 41/009; F02D 2200/1015; F02D 41/1497; F02D 41/0097; F02D 2200/1004; B60W 10/06; B60W 10/08; B60W 20/30; B60W 2710/0666; B60W 2030/206; B60W 2510/0685; B60W 2510/081; B60W 2510/083; B60W 2510/088; B60W 2510/1095; B60W 20/15; B60W 30/20; Y02T 10/40; Y02T 10/62; B60K 6/445;
  (Continued)

(56) References Cited

U.S. PATENT DOCUMENTS

2009/0145210 A1   6/2009  Suzuki
2012/0270697 A1*  10/2012 Takami ................. B60W 20/40
                                                     180/65.265

FOREIGN PATENT DOCUMENTS

CN    106525306 A  *  3/2017
CN    110293960 A  *  10/2019  ............. B60K 6/445
(Continued)

*Primary Examiner* — Justin Holmes
(74) *Attorney, Agent, or Firm* — Oliff PLC

(57) ABSTRACT

A control system includes a first control device and a second control device. The second control device transmits, to the first control device, a resonance influence torque or a first motor rotation angle speed, and information acquisition timing, which is an acquisition timing of the first motor rotation angle speed. The first control device calculates an engine inertia torque based on an engine rotation angle speed. The first control device selects the resonance influence torque based on the first motor rotation angle speed acquired at a predetermined derivation timing, based on the received information acquisition timing, and derives, as an engine torque, a sum of the resonance influence torque and the engine inertia torque, calculated based on the engine rotation angle speed derived at the predetermined derivation timing.

5 Claims, 6 Drawing Sheets

(51) Int. Cl.
 *B60W 10/08* (2006.01)
 *B60W 20/30* (2016.01)
(52) U.S. Cl.
 CPC . *B60W 2710/0666* (2013.01); *F02D 2250/14* (2013.01); *F02D 2250/28* (2013.01)
(58) Field of Classification Search
 CPC ......... B60L 2240/441; B60L 2240/443; B60L 50/13
 See application file for complete search history.

(56) References Cited

FOREIGN PATENT DOCUMENTS

| | | | |
|---|---|---|---|
| EP | 1 965 067 | A1 | 9/2008 |
| JP | 2008-057492 | A | 3/2008 |
| JP | 2010167861 | A * | 8/2010 |
| JP | 6604247 | B2 | 11/2019 |

* cited by examiner

CONTROL SYSTEM OF VEHICLE

CROSS-REFERENCE TO RELATED APPLICATION

This application claims priority to Japanese Patent Application No. 2021-002106 filed on Jan. 8, 2021, incorporated herein by reference in its entirety.

BACKGROUND

1. Technical Field

The present disclosure relates to a control system of a vehicle having a function of estimating an engine torque, which is an output torque of an engine.

2. Description of Related Art

Japanese Unexamined Patent Application Publication No. 2008-57492 describes an example of a vehicle including an engine, a damper connected to a crankshaft of the engine, and a power transfer device. The power transfer device has an input shaft connected to the damper and a motor generator. A rotor of the motor generator rotates in synchronization with the input shaft.

A vehicle control system includes a first control device that controls an engine and a second control device that controls a power transfer device. The first control device receives a detection signal from a crank angle sensor as an input. The second control device receives a detection signal from a rotation position detection sensor as an input. The crank angle sensor detects a rotation angle of the crankshaft and outputs a detection signal according to a rotation speed of the crankshaft. The rotation position detection sensor detects a rotation angle of the rotor in the motor generator and outputs a detection signal according to a rotation speed of the rotor.

An output of the engine is input to the input shaft of the power transfer device via the damper. At this time, when an engine torque fluctuates, torsional vibrations occur in the damper, and a resonance caused by the torsional vibrations may occur in the input shaft of the power transfer device. When such a resonance occurs in the input shaft of the power transfer device, a resonance influence torque, which is the torque caused by the resonance, is input to the crankshaft. As a result, a rotation angle speed of the crankshaft fluctuates.

For this reason, when the engine torque is calculated using the rotation angle speed of the crankshaft, it is necessary to calculate the engine torque in consideration of the resonance influence torque. In other words, an engine inertia torque is calculated based on a value obtained by calculating a time derivative of the rotation angle speed of the crankshaft. The resonance influence torque is calculated based on a value obtained by calculating a time derivative of a rotation angle speed of the input shaft of the power transfer device and a value obtained by calculating a time derivative of a rotation angle speed of the motor generator. Then, a sum of the engine inertia torque and the resonance influence torque is calculated as the engine torque.

SUMMARY

In order to calculate the engine torque by the first control device, a case can be considered in which information required for calculating the resonance influence torque is transmitted from the second control device and received by the first control device. Examples of the information required for calculating the resonance influence torque can include the rotation angle speed of the input shaft of the power transfer device and the rotation angle speed of the motor generator.

In this case, the first control device calculates the resonance influence torque based on the latest information received from the second control device and calculates the engine inertia torque using the latest value of the rotation angle speed of the crankshaft. Then, the first control device calculates, as the engine torque, a sum of a calculated value of the latest resonance influence torque and a calculated value of the latest engine inertia torque.

However, when the information is transmitted from the second control device to the first control device, a delay due to communication occurs. For this reason, a deviation occurs between a detection timing of the information used for calculating the resonance influence torque and a detection timing of the rotation angle speed of the crankshaft used for calculating the engine inertia torque. In other words, a sum of the resonance influence torque of a first timing and the engine inertia torque of a second timing, which is different from the first timing, is calculated as the engine torque. Therefore, there is room for improvement in terms of enhancing the accuracy of the calculation of the engine torque.

Such an issue also arises when the resonance influence torque is calculated by the second control device, transmitted from the second control device and received by the first control device.

An aspect of the present disclosure is a control system of a vehicle. The control system includes an engine mounted on the vehicle, a damper connected to a crankshaft of the engine, a power transfer device having an input shaft that is connected to the damper and a rotating body that rotates in synchronization with the input shaft, a first sensor configured to detect a rotation angle of the crankshaft, a second sensor configured to detect a rotation angle of the input shaft or the rotating body, a first control device configured to receive a detection signal of the first sensor as an input, and a second control device configured to receive a detection signal of the second sensor as an input and to communicate with the first control device. The second control device is configured to execute a transfer device side rotation angle speed acquisition process for acquiring, based on the detection signal of the second sensor, a rotation angle speed of the input shaft or the rotating body as a transfer device side rotation angle speed. The second control device is configured to execute a transmission process for transmitting, to the first control device, a resonance influence torque or the transfer device side rotation angle speed, and an information acquisition timing, which is an acquisition timing of the transfer device side rotation angle speed. The resonance influence torque is torque caused by a resonance occurring in the power transfer device and calculated based on the transfer device side rotation angle speed. The first control device is configured to execute a rotation angle speed derivation process for deriving, based on the detection signal of the first sensor, a rotation angle speed of the crankshaft as an engine rotation angle speed, an inertia torque calculation process for calculating an engine inertia torque based on the engine rotation angle speed, and an engine torque calculation process for calculating a sum of the resonance influence torque and the engine inertia torque as an engine torque, which is an output torque of the engine. The first control device is configured to, in the engine torque calculation process, select the resonance influence torque based on the transfer device side rotation angle speed, which is acquired at a predetermined derivation timing based on the information acquisition timing received from the second control device, and calculate, as the engine torque, the sum of the resonance influence torque and the engine inertia torque which is calculated based on the engine rotation angle speed derived at the derivation timing.

With the above configuration, the following values are used when calculating the engine torque in the engine torque calculation process:

The engine inertia torque, which is calculated based on the engine rotation angle speed acquired at the predetermined derivation timing.

The resonance influence torque, which is calculated based on the transfer device side rotation angle speed acquired at the predetermined derivation timing.

In other words, in the above configuration, the engine torque is calculated using the synchronized engine inertia torque and resonance influence torque. As such, it is possible to increase the accuracy of the calculation of the engine torque.

In the above aspect, the engine may be a spark ignition-kind engine, and the first control device may execute, when an ignition timing of the engine is advanced, a derivation timing adjustment process for bringing forward the derivation timing.

For example, even when the engine is normally operating, an actual value of the engine torque pulsates. In other words, the actual value of the engine torque increases after the ignition timing, and the actual value of the engine torque decreases after increasing to the maximum value.

With the above configuration, the derivation timing varies depending on the ignition timing of the engine. As such, even when the ignition timing is changed, it is possible to prevent a derivation amount between the ignition timing and the derivation timing from changing.

In the above aspect, the second control device may execute a resonance influence torque calculation process for calculating, based on the transfer device side rotation angle speed, the resonance influence torque, and transmit, in the transmission process, to the first control device, the resonance influence torque and the information acquisition timing, which is the acquisition timing of the transfer device side rotation angle speed used for calculating the resonance influence torque.

With the above configuration, the second control device calculates the resonance influence torque based on the transfer device side rotation angle speed. Then, the information acquisition timing, which is the acquisition timing of the transfer device side rotation angle speed used for calculating the resonance influence torque, and the resonance influence torque are transmitted from the second control device and received by the first control device. For this reason, the first control device can grasp a timing when the transfer device side rotation angle speed used for calculating the resonance influence torque received from the second control device is acquired. Therefore, the first control device can calculate the engine torque using the synchronized engine inertia torque and resonance influence torque.

In the above aspect, the power transfer device may have a motor generator, a rotor of the motor generator may be the rotating body that rotates in synchronization with the input shaft, and the second sensor may detect a rotation angle of the rotating body. The second control device may acquire, in the transfer device side rotation angle speed acquisition process, the rotation angle speed of the rotating body as the transfer device side rotation angle speed and transmit, in the transmission process, to the first control device, a motor torque, which is an output torque of the motor generator, the rotation angle speed of the rotating body, the rotation angle speed of the input shaft, and the information acquisition timing, which is an acquisition timing of the rotation angle speed of the rotating body. The first control device may execute the resonance influence torque calculation process for calculating the resonance influence torque based on the motor torque, the rotation angle speed of the rotating body, and the rotation angle speed of the input shaft received from the second control device.

With the above configuration, the motor torque, the rotation angle speed of the rotating body, and the rotation angle speed of the input shaft are transmitted to the first control device. The first control device calculates the resonance influence torque based on the information received from the second control device. Then, the first control device calculates, as the engine torque, a sum of a calculated value of the resonance influence torque, which is calculated based on the rotation angle speed of the rotating body acquired at the predetermined derivation timing, and the engine inertia torque which is calculated based on the engine rotation angle speed derived at the derivation timing.

In the above aspect, the second control device may execute a motor torque acquisition process for acquiring, as the motor torque, a calculated value of the output torque of the motor generator based on a motor current value, which is a value indicating current flowing through the motor generator.

With the above configuration, it is possible to use, for calculating a resonance influence torque, a calculated value of an output torque of a motor generator.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
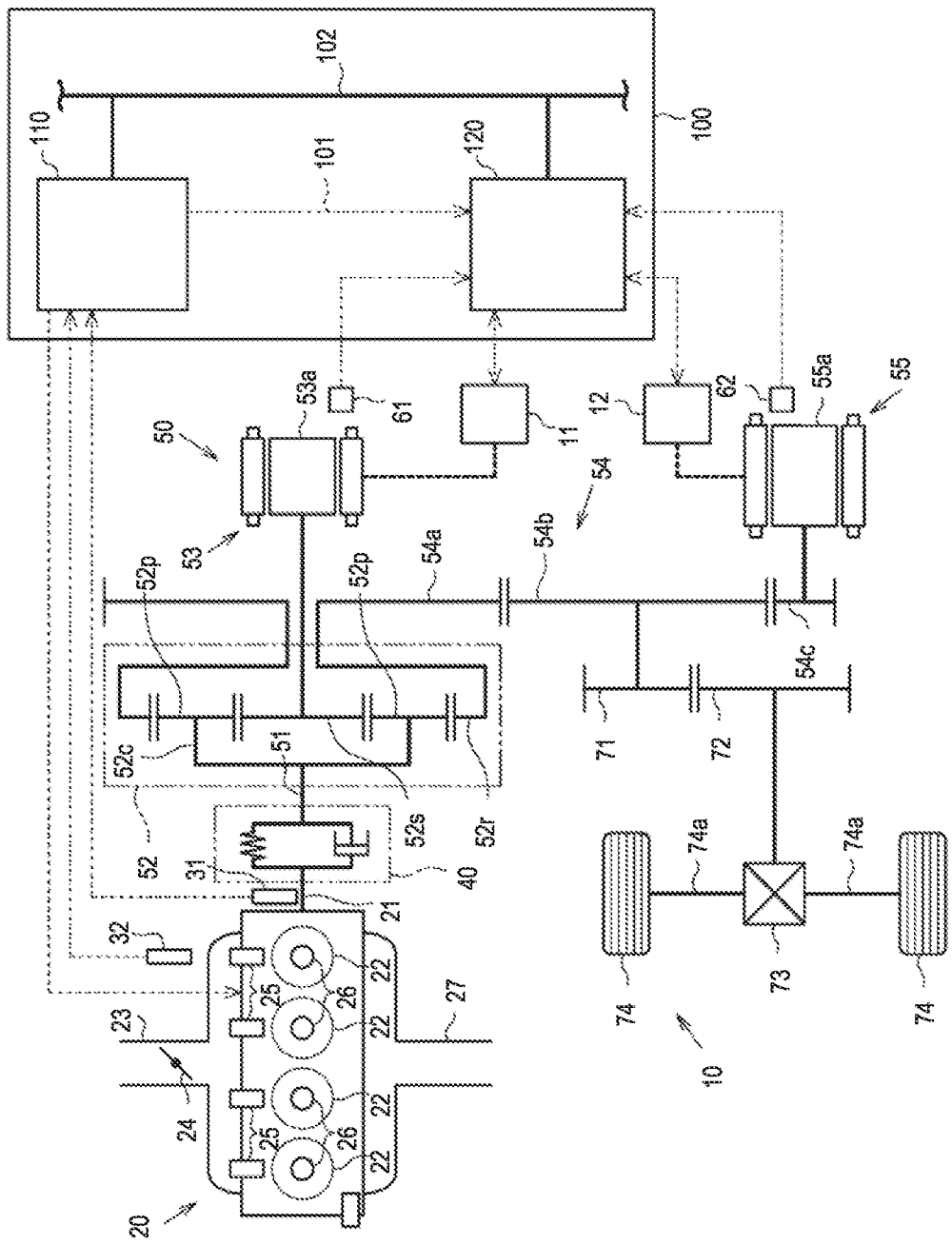
FIG. 1 is a configuration diagram schematically illustrating a hybrid vehicle to which a control system of a vehicle according to a first embodiment is applied.

Hereinafter, a first embodiment of a vehicle control system will be described with reference to FIGS. 1 to 4. As illustrated in FIG. 1, a control system 100 according to the present embodiment is applied to a hybrid vehicle 10.

Overall Configuration of Hybrid Vehicle 10

The hybrid vehicle 10 includes an engine 20, a damper 40 connected to a crankshaft 21 of the engine 20, and a power transfer device 50. The damper 40 has a function of attenuating fluctuations of torque output from the engine 20 and transferring the fluctuations to the power transfer device 50.

The engine 20 is a spark ignition-type engine. The engine 20 includes a plurality of cylinders 22, an air-intake passage 23 through which intake air introduced into each cylinder 22 flows, and a throttle valve 24 arranged in the air-intake passage 23. The throttle valve 24 adjusts an intake air amount, which is a flow rate of the intake air in the air-intake passage 23.

The engine 20 is provided with a fuel injection valve 25 and an ignition device 26 for each cylinder. In each cylinder 22, an air-fuel mixture that contains fuel injected from the fuel injection valve 25 and the intake air is combusted by spark discharging by the ignition device 26. As above, since a piston reciprocates in the cylinder 22 by the combustion of the air-fuel mixture in the cylinder 22, the crankshaft 21 rotates. Further, exhaust gas generated in each cylinder 22 by the combustion of the air-fuel mixture is discharged to an exhaust passage 27.

The engine 20 includes a plurality of types of sensors that output detection signals to the control system 100. Examples of the sensors can include a crank angle sensor 31 and a cam angle sensor 32. The crank angle sensor 31 detects a rotation angle of the crankshaft 21 and outputs a detection signal according to a rotation speed of the crankshaft 21. Further, the cam angle sensor 32 detects a rotation angle of the cam shaft that rotates in synchronization with the crankshaft 21 and outputs a detection signal according to a rotation speed of the cam shaft. In the present embodiment, the crank angle sensor 31 corresponds to a "first sensor".

The power transfer device 50 includes an input shaft 51 connected to the damper 40 and a planetary gear mechanism 52. The planetary gear mechanism 52 has a sun gear 52s, a ring gear 52r, and a plurality of pinion gears 52p that mesh with both the sun gear 52s and the ring gear 52r. Each pinion gear 52p is supported by a carrier 52c in a state where it can rotate and revolve around the sun gear 52s. The input shaft 51 is connected to the carrier 52c.

The power transfer device 50 includes a first motor generator 53. A rotor 53a, which is a rotor of the first motor generator 53, is connected to the sun gear 52s. In other words, since the first motor generator 53 is connected to the input shaft 51 via the planetary gear mechanism 52, the rotor 53a of the first motor generator 53 rotates in synchronization with the input shaft 51.

The power transfer device 50 includes a gear mechanism 54 and a second motor generator 55. The gear mechanism 54 has a counter drive gear 54a, a counter driven gear 54b, and a reduction gear 54c. The counter drive gear 54a rotates integrally with the ring gear 52r. The counter driven gear 54b meshes with the counter drive gear 54a. The reduction gear 54c meshes with the counter driven gear 54b. The reduction gear 54c is connected to a rotor 55a, which is a rotor of the second motor generator 55.

The power transfer device 50 includes a plurality of types of sensors that output detection signals to the control system 100. Examples of the sensors can include a first motor angle sensor 61 and a second motor angle sensor 62. The first motor angle sensor 61 detects a rotation angle of the rotor 53a of the first motor generator 53 and outputs a detection signal according to a rotation speed of the rotor 53a. The second motor angle sensor 62 detects a rotation angle of a rotor 55a of the second motor generator 55 and outputs a detection signal according to a rotation speed of the rotor 55a. In the present embodiment, the first motor angle sensor 61 corresponds to a "second sensor", and the rotor 53a of the first motor generator 53 corresponds to a "rotating body" that rotates in synchronization with the input shaft 51.

The hybrid vehicle 10 includes a final drive gear 71 that rotates integrally with the counter driven gear 54b and a final driven gear 72 that meshes with the final drive gear 71. The final drive gear 71 is connected to axles 74a of drive wheels 74 via an operating mechanism 73.

The hybrid vehicle 10 includes a first inverter 11, which is an inverter for the first motor generator 53, and a second inverter 12, which is an inverter for the second motor generator 55. In other words, the first motor generator 53 is driven by controlling the first inverter 11 and the second motor generator 55 is driven by controlling the second inverter 12.

Configuration of Control System 100

As illustrated in FIG. 1, the control system 100 includes a first control device 110 that controls the engine 20 and a second control device 120 that controls the power transfer device 50. The first control device 110 receives, as inputs, detection signals from various sensors included in the engine 20. The second control device 120 receives, as inputs, detection signals from various sensors included in the power transfer device 50. In other words, the first control device 110 receives, as inputs, detection signals of the crank angle sensor 31 and the cam angle sensor 32. The second control device 120 receives, as inputs, detection signals of the first motor angle sensor 61 and the second motor angle sensor 62.

The control system 100 includes a signal line 101 used for transmitting a crank counter CNTcr acquired by the first control device 110 to the second control device 120. The crank counter CNTcr is a value that is counted up every time the rotation angle of the crankshaft 21 is increased by a predetermined rotation angle. Then, when one cycle of the engine 20 is completed, the crank counter CNTcr is reset to "0". For example, in one cycle of the engine 20, the crank counter CNTcr is counted up to "15".

The signal line 101 is a signal line dedicated for transmitting the crank counter CNTcr from the first control device 110. For this reason, a delay occurring when the crank counter CNTcr is transmitted to the second control device 120 using the signal line 101 is sufficiently restricted within a range in which the delay does not influence execution of various processes based on the crank counter CNTcr.

The control system 100 includes a CAN communication line 102 used for transmitting and receiving various types of information between the control devices 110 and 120. The CAN communication line 102 is used for transmitting and receiving information in a large number of control devices mounted on the hybrid vehicle 10. For this reason, for example, when the information obtained by the second control device 120 is transmitted to the first control device 110 via the CAN communication line 102, a delay occurs between a timing when the information is transmitted by the second control device 120 and a timing when the information is received by the first control device 110.

Each of the control devices 110, 120 includes a CPU, a ROM, and a storage device, which is an electrically rewritable non-volatile memory (none of which are shown). The ROM stores a control program executed by the CPU. The storage device stores various calculation results of the CPU and the like.

Processing Content in Control System 100

The first control device 110 of the control system 100 calculates an engine torque Te, which is a calculated value of an output torque of the engine 20. Since the crankshaft 21 of the engine 20 is connected to the input shaft 51 of the power transfer device 50 via the damper 40, the first control device 110 calculates the engine torque Te further using the information acquired by the second control device 120.

Figure 2:
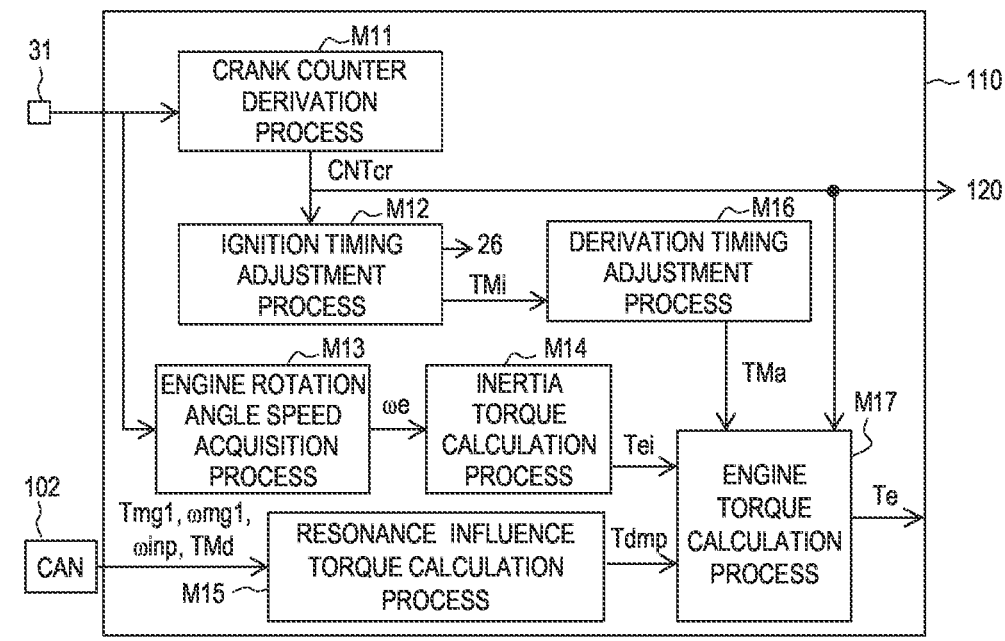
FIG. 2 is a block diagram describing each process executed by the first control device and each process executed by the second control device in the control system according to the first embodiment.
Figure 2:
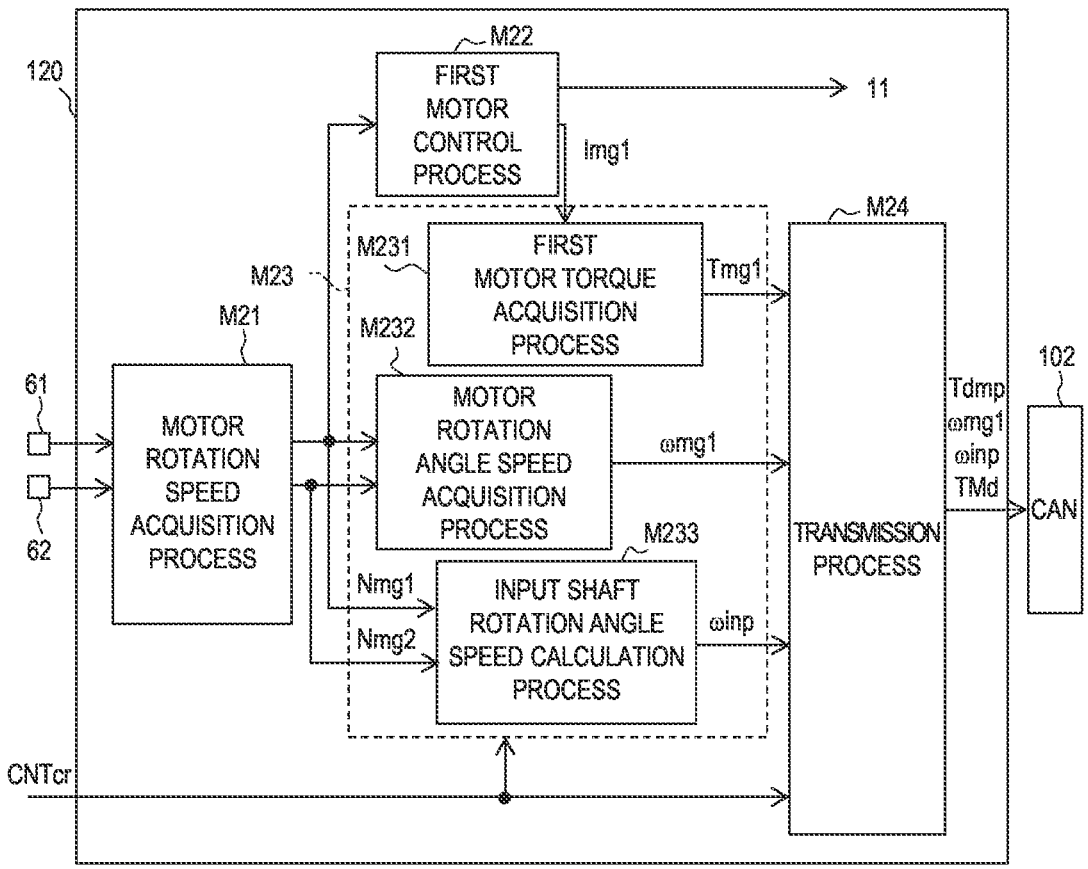

With reference to FIG. 2, each process respectively executed by the control devices 110, 120 used for calculating the engine torque Te will be described. First, various processes executed by the second control device 120 will be described.

The second control device 120 executes a motor rotation speed acquisition process M21. In other words, the second control device 120 acquires a first motor rotation speed Nmg1, which is the rotation speed of the rotor 53*a* of the first motor generator 53, based on a detection signal of the first motor angle sensor 61. The second control device 120 acquires a second motor rotation speed Nmg2, which is the rotation speed of the rotor 55*a* of the second motor generator 55, based on the detection signal of the second motor angle sensor 62. The second control device 120 repeatedly executes the motor rotation speed acquisition process M21 at predetermined cycles to calculate the first motor rotation speed Nmg1 and the second motor rotation speed Nmg2.

The second control device 120 executes a first motor control process M22 for controlling the first motor generator 53. In the first motor control process M22, the second control device 120 controls the first inverter 11 for the first motor generator 53 based on the first motor rotation speed Nmg1. Further, the second control device 120 acquires a first motor current value Img1, which is a value indicating current flowing through the first motor generator 53.

The second control device 120 executes an information acquisition process M23 for calculating or acquiring information transmitted to the first control device 110. In the present embodiment, the information acquisition process M23 includes a first motor torque acquisition process M231, a motor rotation angle speed acquisition process M232, and an input shaft rotation angle speed calculation process M233.

In the first motor torque acquisition process M231, the second control device 120 acquires a first motor torque Tmg1, which is an output torque of the first motor generator 53. In the present embodiment, the second control device 120 acquires, as the first motor torque Tmg1, a calculated value of the output torque of the first motor generator 53 based on the first motor current value Img1, which is acquired in the first motor control process M22.

The second control device 120 repeatedly executes the first motor torque acquisition process M231 at predetermined intervals. For example, the second control device 120 executes the first motor torque acquisition process M231 to acquire the first motor torque Tmg1 every time the crank counter CNTcr transmitted from the first control device 110 changes.

In the motor rotation angle speed acquisition process M232, the second control device 120 acquires a first motor rotation angle speed ωmg1, which is a rotation angle speed of the rotor 53*a* of the first motor generator 53. Further, the second control device 120 acquires a second motor rotation angle speed ωmg2, which is a rotation angle speed of the rotor 55*a* of the second motor generator 55. In the present embodiment, the second control device 120 acquires the first motor rotation angle speed ωmg1 based on the first motor rotation speed Nmg1 and acquires the second motor rotation angle speed ωmg2 based on the second motor rotation speed Nmg2. For example, the second control device 120 acquires a value obtained by calculating a time derivative of the first motor rotation speed Nmg1 as the first motor rotation angle speed ωmg1 and a value obtained by calculating a time derivative of the second motor rotation speed Nmg2 as the second motor rotation angle speed ωmg2.

The second control device 120 executes the motor rotation angle speed acquisition process M232 at predetermined intervals. For example, the second control device 120 executes the motor rotation angle speed acquisition process M232 every time the crank counter CNTcr transmitted from the first control device 110 changes, to obtain the first motor rotation angle speed ωmg1 and the second motor rotation angle speed ωmg2.

As described above, in the present embodiment, the first motor angle sensor 61 corresponds to a "second sensor". For this reason, the first motor rotation angle speed ωmg1 corresponds to a "transfer device side rotation angle speed", which is acquired based on the detection signal of the first motor angle sensor 61. Further, the motor rotation angle speed acquisition process M232 for acquiring the first motor rotation angle speed ωmg1 corresponds to a "transfer device side rotation angle speed acquisition process".

In the input shaft rotation angle speed calculation process M233, the second control device 120 calculates an input shaft rotation angle speed ωinp, which is a rotation angle speed of the input shaft 51 of the power transfer device 50. In other words, the second control device 120 calculates the input shaft rotation angle speed ωinp based on the first motor rotation speed Nmg1 and the second motor rotation speed Nmg2, which are acquired in the motor rotation speed acquisition process M21. For example, the second control device 120 calculates an input shaft rotation speed Ninp by entering the first motor rotation speed Nmg1 and the second motor rotation speed Nmg2 into the following relational equation (Equation 1). In the relational equation (Equation 1), "ρ" is a gear ratio of the planetary gear mechanism 52. The gear ratio ρ of the planetary gear mechanism 52 is a value obtained by dividing the number of teeth of the sun gear 52*s* by the number of teeth of the ring gear 52*r*. Further, "Gr" is a gear ratio of the gear mechanism 54 of the power transfer device 50.

$$Ninp = \frac{(\rho \cdot Nmg1 + Gr \cdot Nmg2)}{(1 + \rho)} \quad \text{(Equation 1)}$$

Then, the second control device 120 calculates the input shaft rotation angle speed ωinp by entering the input shaft rotation speed Ninp into the following relational equation (Equation 2):

$$\omega inp = 2\pi \cdot \frac{Ninp}{80} \quad \text{(Equation 2)}$$

The second control device 120 executes the input shaft rotation angle speed calculation process M233 at predetermined intervals. For example, the second control device 120 executes the input shaft rotation angle speed calculation process M233 to acquire the input shaft rotation angle speed ωinp every time the crank counter CNTcr transmitted from the first control device 110 changes.

The second control device 120 executes a transmission process M24. In the transmission process M24, the second control device 120 transmits information required for calculating the engine torque Te by the first control device 110 to the first control device 110. In the present embodiment, the second control device 120 outputs, to the CAN communication line 102, the first motor torque Tmg1, the first motor rotation angle speed ωmg1, the input shaft rotation angle speed ωinp, and an information acquisition timing TMd in association with each other. In the present embodiment, the second control device 120 outputs, to the CAN communication line 102, as the information acquisition timing TMd, the crank counter CNTcr at the time of acquiring the transmitted first motor rotation angle speed ωmg1.

The information obtained in the information acquisition process M23 and the information acquisition timing TMd are transmitted from the second control device 120 to the CAN communication line 102. Then, the information and the information acquisition timing TMd are received by the first control device 110 via the CAN communication line 102.

Next, various processes executed by the first control device 110 will be described. The first control device 110 executes a crank counter derivation process M11 for deriving the crank counter CNTcr. In other words, the first control device 110 monitors the crank angle, which is the rotation angle of the crankshaft 21, based on the detection signal of the crank angle sensor 31. Then, the first control device 110 increases the crank counter CNTcr by "1" each time the crank angle increases by a predetermined angle. Further, when one cycle of the engine 20 is completed, the first control device 110 resets the crank counter CNTcr to "0".

The first control device 110 executes an ignition timing adjustment process M12 for varying the ignition timing TMi depending on an operation state of the engine 20. For example, when the engine 20 is warmed up, the first control device 110 advances the ignition timing TMi as compared with a case where the engine 20 is not warmed up. Then, the first control device 110 controls the ignition device 26 based on the ignition timing TMi, which is adjusted in the ignition timing adjustment process M12.

The first control device 110 executes an engine rotation angle speed acquisition process M13 for acquiring an engine rotation angle speed ωe, which is a rotation angle speed of the crankshaft 21. In the engine rotation angle speed acquisition process M13, the first control device 110 calculates an engine rotation speed Ne, which is a rotation speed of the crankshaft 21, based on the detection signal of the crank angle sensor 31. Then, the first control device 110 acquires, as the engine rotation angle speed ωe, a value obtained by calculating a time derivative of the engine rotation speed Ne.

The first control device 110 executes the engine rotation angle speed acquisition process M13 at predetermined intervals. For example, the first control device 110 executes the engine rotation angle speed acquisition process M13 to acquire the engine rotation angle speed w e every time the crank counter CNTcr changes.

The first control device 110 executes an inertia torque calculation process M14 for calculating an engine inertia torque Tei, which is an inertia torque of the engine 20. For example, the first control device 110 calculates the engine inertia torque Tei by entering the engine rotation angle speed ωe, acquired in the engine rotation angle speed acquisition process M13, into the following relational equation (Equation 3). In the relational equation (Equation 3), "Ie" is an inertia moment of the engine 20. In other words, the first control device 110 can calculate the engine inertia torque Tei using a value obtained by calculating a time derivative of the engine rotation angle speed ωe.

$$Tei = Ie \cdot \frac{d\omega e}{d1} \tag{Equation 3}$$

The first control device 110 executes the inertia torque calculation process M14 at predetermined intervals. For example, the first control device 110 executes the inertia torque calculation process M14 to acquire the engine inertia torque Tei every time the crank counter CNTcr changes.

Here, the output of the engine 20 is input to the input shaft 51 of the power transfer device 50 via the damper 40. At this time, when the engine torque fluctuates, torsional vibrations may occur in the damper 40, and a resonance caused by the torsional vibrations may occur in the input shaft 51. When such a resonance occurs in the input shaft 51, torque caused by the resonance is input to the crankshaft 21. In the present embodiment, the torque caused by the resonance that occurs in the power transfer device 50 in this manner is referred to as a "resonance influence torque".

The first control device 110 executes a resonance influence torque calculation process M15 for calculating a resonance influence torque Tdmp. In the resonance influence torque calculation process M15, the first control device 110 calculates the resonance influence torque Tdmp based on the information received via the CAN communication line 102, that is, the first motor torque Tmg1, the first motor rotation angle speed ωmg1, and the input shaft rotation angle speed ωinp. For example, the first control device 110 calculates the resonance influence torque Tdmp by entering the first motor torque Tmg1, the first motor rotation angle speed ωmg1, and the input shaft rotation angle speed ωinp into the following relational equation (Equation 4). In the relational equation (Equation 4), "Iinp" is an inertia moment of the input shaft 51, and "Ig" is an inertia moment of the first motor generator 53. With the relational equation (Equation 4), the first control device 110 can calculate the resonance influence torque Tdmp using a value obtained by calculating a time derivative of the input shaft rotation angle speed ωinp and a value obtained by calculating a time derivative of the first motor rotation angle speed ωmg1.

$$Tdmp = Iinp \cdot \frac{d\omega inp}{d1} + \frac{(1+\rho)}{\rho} \cdot \left( Ig \cdot \frac{d\omega mg1}{d1} - Tmg1 \right) \tag{Equation 4}$$

The first control device 110 executes the resonance influence torque calculation process M15 at predetermined intervals. For example, each time the first control device 110 receives the above information via the CAN communication line 102, the first control device 110 executes the resonance influence torque calculation process M15 to calculate the resonance influence torque Tdmp.

The first control device 110 executes a derivation timing adjustment process M16. In other words, the first control device 110 adjusts a derivation timing TMa according to the ignition timing TMi, which is adjusted in the ignition timing adjustment process M12. For example, when the ignition timing TMi is advanced, the first control device 110 brings forward the derivation timing TMa. In this case, a timing delayed by a predetermined delay period ΔTM from the ignition timing TMi is set as the derivation timing TMa. As the delay period ΔTM, a period having a length shorter than a half of one cycle of the engine 20 is set.

When the ignition timing TMi arrives, the air-fuel mixture is combusted in the cylinder 22 by an operation of the ignition device 26. Then, an actual value of the engine torque is increased by the combustion of the air-fuel mixture. When the actual value of the engine torque reaches its peak, it is decreased until the combustion of the air-fuel mixture in a next cylinder 22 is started. In other words, immediately after the ignition timing TMi, the influence of the combustion in the cylinder 22 is greatly reflected in the actual value of the engine torque. However, when it is delayed from the ignition timing TMi, it is difficult for the influence of the combustion in the cylinder 22 to be reflected in the actual value of the engine torque. Therefore, the delay period ΔTM is set such that the timing when the influence of the combustion in the cylinder 22 is greatly reflected in the actual value of the engine torque is set as the derivation timing TMa.

The first control device 110 executes an engine torque calculation process M17 for calculating the engine torque Te. In other words, the first control device 110 calculates, as an engine torque Te, a sum of the engine inertia torque Tei, which is calculated in the inertia torque calculation process M14, and the resonance influence torque Tdmp, which is calculated in the resonance influence torque calculation process M15. In the present embodiment, the first control device 110 calculates the engine torque Te using the derivation timing TMa, which is adjusted in the derivation timing adjustment process M16, and the crank counter CNTcr.

Figure 3:
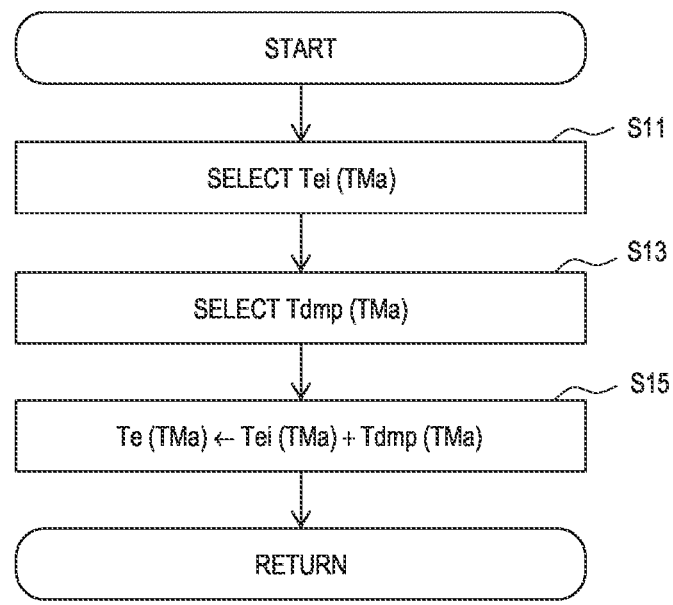
FIG. 3 is a flowchart describing an engine torque calculation process.

With reference to FIG. 3, the engine torque calculation process M17 will be described. In the engine torque calculation process M17, first, in step S11, the first control device 110 selects the engine inertia torque Tei (TMa), which is calculated based on the engine rotation angle speed ωe derived at the derivation timing TMa, from among a plurality of engine inertia torques Tei calculated in the inertia torque calculation process M14. In other words, the first control device 110 selects the engine inertia torque Tei, which is derived when the crank counter CNTcr is equal to a value indicating the derivation timing TMa, as the engine inertia torque Tei (TMa).

Subsequently, in step S13, the first control device 110 selects the resonance influence torque Tdmp (TMa), which is calculated based on the first motor rotation angle speed ωmg1 derived at the derivation timing TMa, from among a plurality of resonance influence torques Tdmp calculated in the resonance influence torque calculation process M15. In other words, the first control device 110 selects the resonance influence torque Tdmp, which is calculated based on the first motor rotation angle speed ωmg1 when the information acquisition timing TMd is equal to the derivation timing TMa, as the resonance influence torque Tdmp (TMa).

Then, in step S15, the first control device 110 calculates, as the engine torque Te (TMa), a sum of the engine inertia torque Tei (TMa) and the resonance influence torque Tdmp (TMa). In other words, the first control device 110 calculates the engine torque Te (TMa) at the derivation timing TMa. Thereafter, the first control device 110 temporarily ends the engine torque calculation process M17.

Action and Advantageous Effect in First Embodiment

The second control device 120 receives, as inputs, the detection signal of the first motor angle sensor 61 and the detection signal of the second motor angle sensor 62. For this reason, in the second control device 120, the first motor rotation angle speed ωmg1 and the input shaft rotation angle speed ωinp are derived. Further, the first motor torque Tmg1 is also acquired. In the present embodiment, the first motor rotation angle speed ωmg1, the input shaft rotation angle speed ωinp, and the first motor torque Tmg1 are information required for calculating the resonance influence torque Tdmp.

In the present embodiment, the second control device 120 transmits, to the first control device 110, via the CAN communication line 102, the first motor rotation angle speed ωmg1, the input shaft rotation angle speed ωinp, and the first motor torque Tmg1 in association with the information acquisition timing TMd.

By executing the resonance influence torque calculation process M15, the first control device 110 calculates the resonance influence torque Tdmp using the first motor rotation angle speed ωmg1, the input shaft rotation angle speed ωinp, and the first motor torque Tmg1, which are transmitted from the second control device 120. Further, by executing the inertia torque calculation process M14, the first control device 110 calculates the engine inertia torque Tei using the engine rotation angle speed ωe.

Here, when the information is transmitted using the CAN communication line 102, a delay occurs between a timing when the information is transmitted from the second control device 120 and a timing when the information is received by the first control device 110.

Therefore, in the present embodiment, based on the information acquisition timing TMd received by the first control device 110 together with the first motor rotation angle speed ωmg1, the input shaft rotation angle speed ωinp, and the first motor torque Tmg1, the resonance influence torque Tdmp (TMa) which is calculated based on the first motor rotation angle speed ωmg1 derived at the derivation timing TMa is selected from among the plurality of resonance influence torques Tdmp calculated in the resonance influence torque calculation process M15. Similarly, the engine inertia torque Tei (TMa) which is calculated based on the engine rotation angle speed ωe derived at the derivation timing TMa is selected from among the plurality of engine inertia torques Tei calculated in the inertia torque calculation process M14. Then, the sum of the engine inertia torque Tei (TMa) and the resonance influence torque Tdmp (TMa) is calculated as the engine torque Te (TMa) at the derivation timing TMa.

In other words, in the present embodiment, it is possible to calculate the engine torque Te using the synchronized engine inertia torque Tei and resonance influence torque Tdmp. As such, it is possible to increase the accuracy of the calculation of the engine torque Te.

In the present embodiment, it is possible to further obtain advantageous effects described below.

(1-1) In the present embodiment, when the ignition timing TMi is advanced, the derivation timing TMa is brought forward. On the other hand, when the ignition timing TMi is retarded, the derivation timing TMa is delayed. For this reason, when the ignition timing TMi is changed, it is possible to prevent a derivation amount between the ignition timing TMi and the derivation timing TMa from changing. As a result, in the engine torque calculation process M17, it is possible to calculate the engine torque Te in which the influence of the combustion of the air-fuel mixture in the cylinder 22 is reflected to the same extent.

Figure 4:
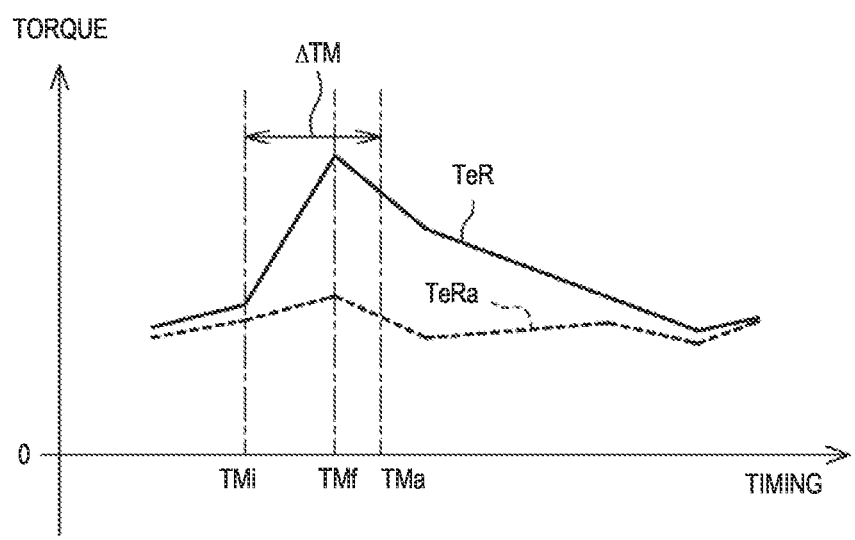
FIG. 4 is a diagram illustrating a transition of an actual value of an engine torque.

In FIG. 4, a transition of the actual value TeR of the engine torque when the air-fuel mixture is normally combusted in the cylinder 22 is represented by a solid line, and a transition of the actual value TeRa of the engine torque when a misfire occurs in the cylinder 22 is represented by a dashed line. When no misfire occurs in the cylinder 22, as represented by the solid line in FIG. 4, the actual value TeR of the engine torque sharply increases from the ignition timing TMi. Then, when the actual value TeR of the engine torque reaches its peak in a first timing TMf, the actual value TeR gradually decreases. On the other hand, when a misfire occurs in the cylinder 22, as represented by the dashed line in FIG. 4, the actual value TeRa of the engine torque does not fluctuate much even after the ignition timing TMi.

For this reason, when a misfire determination is executed using the engine torque Te, the first timing TMf or timings before and after the first timing TMf may be set as the derivation timing TMa. When the ignition timing TMi is changed, this first timing TMf also changes. In this regard, in the present embodiment, the derivation timing TMa is set according to the ignition timing TMi. For this reason, even when the ignition timing TMi is changed, it is possible to set the first timing TMf, or timings before and after the first timing TMf as the derivation timing TMa. Therefore, it is possible to execute the misfire determination with high accuracy.

(1-2) In the present embodiment, the first control device 110 calculates the resonance influence torque Tdmp. For this reason, it is possible to reduce a control load on the second control device 120 as compared with a case where the second control device 120 calculates the resonance influence torque Tdmp.

(1-3) In the present embodiment, the calculated value of the output torque of the first motor generator 53 based on the first motor current value Img1 indicating current flowing through the first motor generator 53 is employed as the first motor torque Tmg1. In this case, when the accuracy of the calculated value of the output torque is high, it is possible to increase the accuracy of the calculation of the resonance influence torque Tdmp as compared with a case where a command value of the output torque is employed as the first motor torque Tmg1.

Second Embodiment

A second embodiment of a control system of a vehicle will be described with reference to FIG. 5. In the description below, parts different from those of the first embodiment will be mainly described, and the same or corresponding member configurations as those in the first embodiment will be designated by the same reference signs and duplicate description thereof will be omitted.

Figure 5:
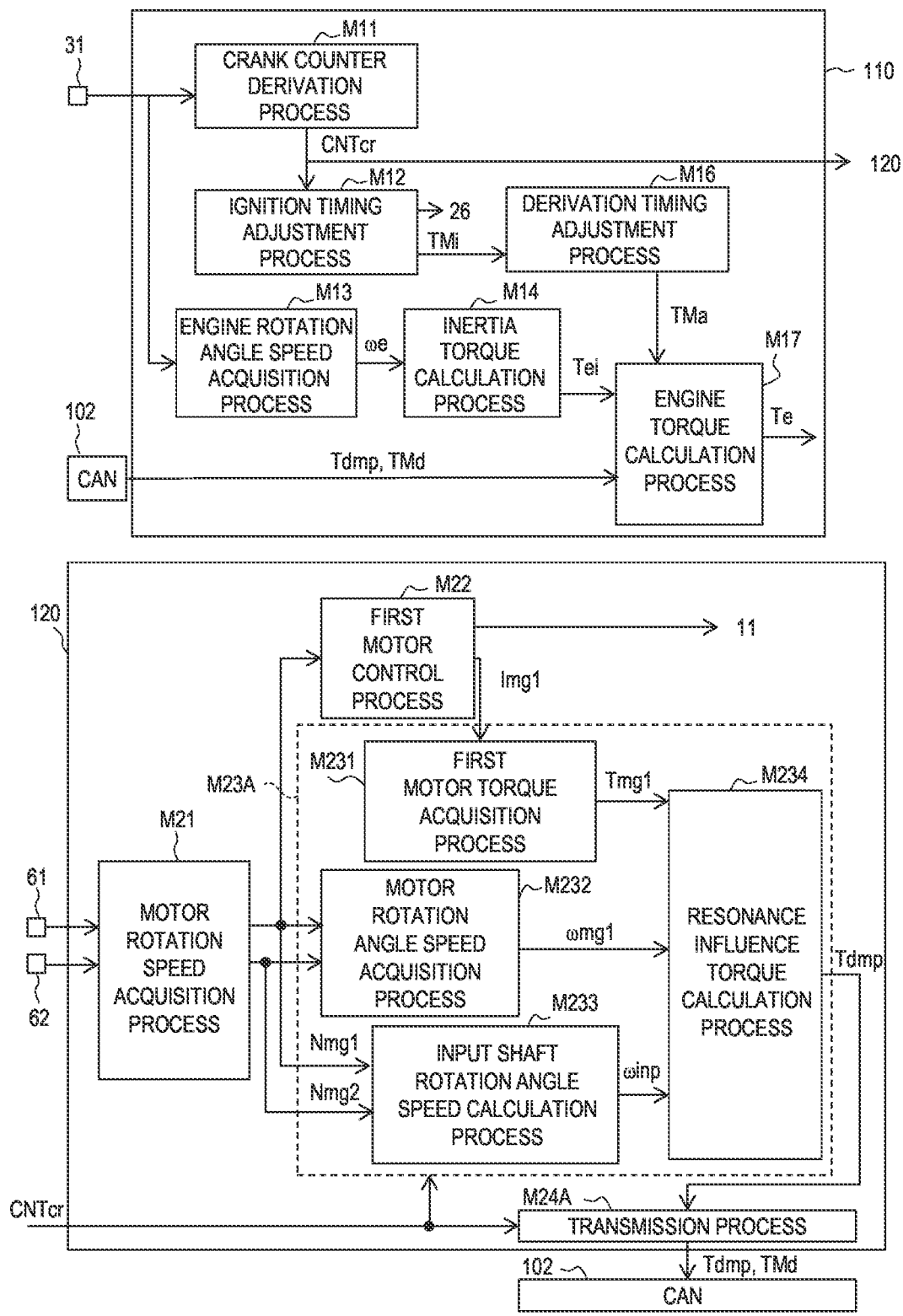
FIG. 5 is a block diagram describing each process executed by the first control device and each process executed by the second control device in a control system according to a second embodiment.

With reference to FIG. 5, from among the processes executed by the control devices 110, 120 used for calculating the engine torque Te, parts different from those of the first embodiment will be mainly described. First, various processes executed by the second control device 120 will be described.

The second control device 120 executes an information acquisition process M23A for calculating or acquiring the information transmitted to the first control device 110. In the present embodiment, the information acquisition process M23A includes a resonance influence torque calculation process M234 in addition to the first motor torque acquisition process M231, the motor rotation angle speed acquisition process M232, and the input shaft rotation angle speed calculation process M233.

In the resonance influence torque calculation process M234, the second control device 120 calculates the resonance influence torque Tdmp. In other words, the second control device 120 calculates the resonance influence torque Tdmp by entering the first motor torque Tmg1, the first motor rotation angle speed $\omega$mg1, and the input shaft rotation angle speed $\omega$inp into the above relational equation (Equation 4).

The second control device 120 executes the resonance influence torque calculation process M234 at predetermined intervals. For example, the second control device 120 executes the resonance influence torque calculation process M234 to calculate the resonance influence torque Tdmp every time the crank counter CNTcr changes.

The second control device 120 executes a transmission process M24A. In the transmission process M24A, the second control device 120 outputs, to the CAN communication line 102, the resonance influence torque Tdmp and the information acquisition timing TMd in association with each other. In the present embodiment, the second control device 120 outputs, to the CAN communication line 102, as the information acquisition timing TMd, the crank counter CNTcr at the time of acquiring the first motor rotation angle speed $\omega$mg1, which is used for calculating the transmitted resonance influence torque Tdmp.

The resonance influence torque Tdmp and the information acquisition timing TMd are transmitted from the second control device 120 in the CAN communication line 102. Then, the resonance influence torque Tdmp and the information acquisition timing TMd are received by the first control device 110 via the CAN communication line 102.

Next, from among the various processes executed by the first control device 110, parts different from those of the first embodiment will be described. In the engine torque calculation process M17, the first control device 110 calculates, as the engine torque Te, the sum of the engine inertia torque Tei, which is calculated in the inertia torque calculation process M14, and the resonance influence torque Tdmp, which is received via the CAN communication line 102. In the present embodiment, the first control device 110 calculates the engine torque Te using the derivation timing TMa, which is adjusted in the derivation timing adjustment process M16, and the crank counter CNTcr.

In other words, as in the first embodiment, the first control device 110 selects the engine inertia torque Tei (TMa), which is calculated based on the engine rotation angle speed $\omega$e derived at the derivation timing TMa, from among the plurality of engine inertia torques Tei calculated in the inertia torque calculation process M14. Further, the first control device 110 selects the resonance influence torque Tdmp (TMa), which is calculated based on the first motor rotation angle speed $\omega$mg1 derived at the derivation timing TMa, from among the plurality of resonance influence torques Tdmp received from the second control device 120. For example, the first control device 110 selects the resonance influence torque Tdmp associated with the information acquisition timing TMd, which is equal to the derivation timing TMa, as the resonance influence torque Tdmp (TMa). Then, the first control device 110 calculates, as the engine torque Te (TMa), the sum of the engine inertia torque Tei (TMa) and the resonance influence torque Tdmp (TMa).

Action and Advantageous Effect in Second Embodiment

With the present embodiment, in addition to the advantageous effects equivalent to the advantageous effects (1-1) and (1-3) in the first embodiment, it is possible to further obtain advantageous effects as below.

(2-1) In the present embodiment, the second control device 120 calculates the resonance influence torque Tdmp. Then, the resonance influence torque Tdmp is transmitted to the first control device 110 via the CAN communication line 102 in a state of being associated with the information acquisition timing TMd.

Based on the information acquisition timing TMd received together with the resonance influence torque Tdmp, the first control device 110 selects the resonance influence torque Tdmp (TMa), which is calculated based on the first motor rotation angle speed $\omega$mg1 derived at the derivation timing TMa, from among the received plurality of resonance influence torques Tdmp. Further, the first control device 110 selects the engine inertia torque Tei (TMa), which is calculated based on the engine rotation angle speed $\omega$e derived at the derivation timing TMa, from among the plurality of engine inertia torques Tei calculated in the inertia torque calculation process M14. Then, the first control device 110 calculates, as the engine torque Te (TMa) at the derivation timing TMa, the sum of the engine inertia torque Tei (TMa) and the resonance influence torque Tdmp (TMa).

In other words, in the present embodiment, it is possible to calculate the engine torque Te using the synchronized engine inertia torque Tei and resonance influence torque Tdmp. As such, it is possible to increase the accuracy of the calculation of the engine torque Te.

(2-2) In the present embodiment, the second control device 120 calculates the resonance influence torque Tdmp. For this reason, it is possible to reduce a control load on the first control device 110 as compared with a case where the first control device 110 calculates the resonance influence torque Tdmp.

Third Embodiment

A third embodiment of a control system of a vehicle will be described with reference to FIG. 6. In the description below, parts different from those of each of the above embodiments will be mainly described, and the same or corresponding member configurations as those in each of the above embodiments will be designated by the same reference signs and duplicate description thereof will be omitted.

Figure 6:
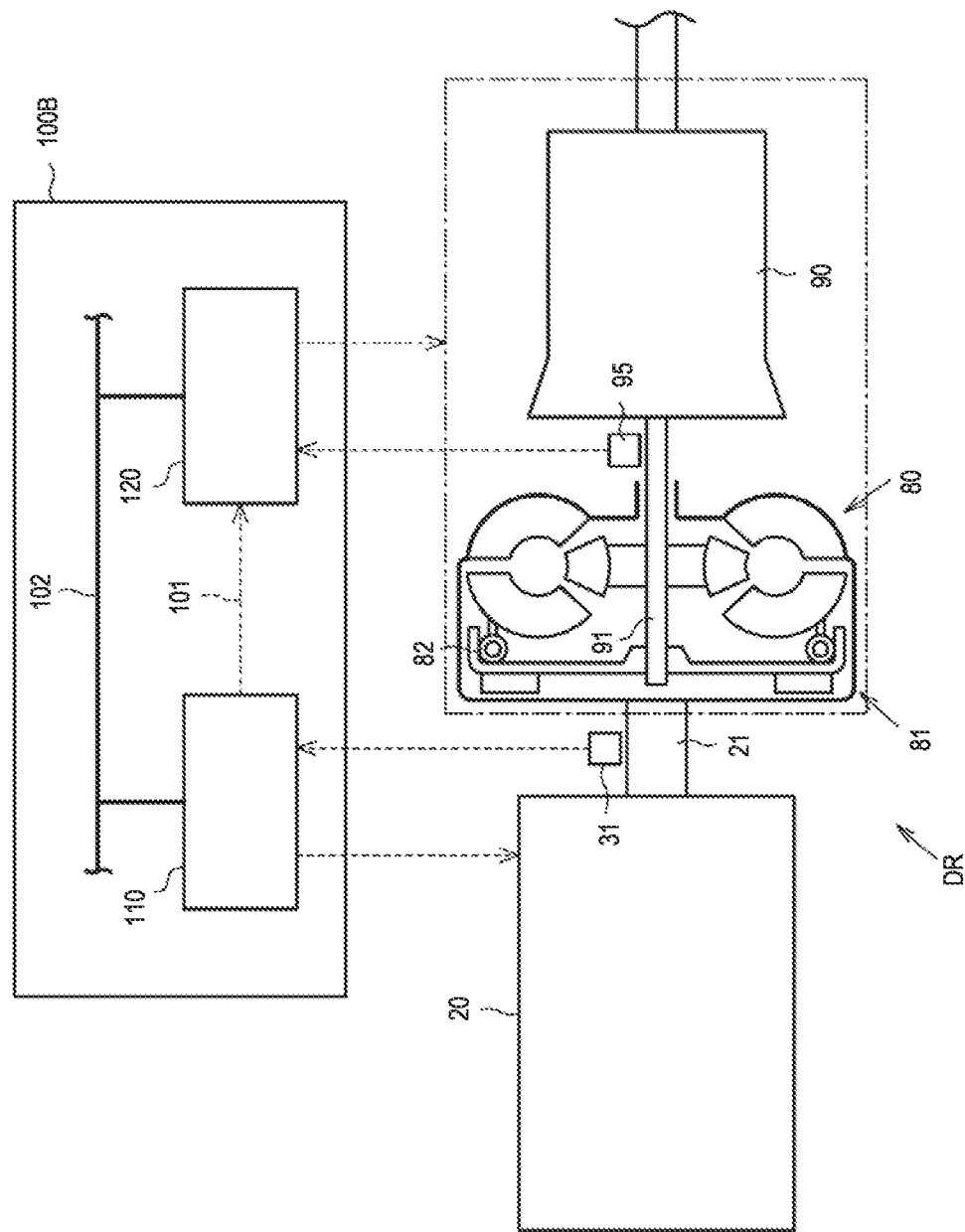
FIG. 6 is a configuration diagram illustrating a control system according to a third embodiment, and a drive system of the vehicle to which the control system is applied.

FIG. 6 illustrates a drive system DR of the vehicle to which a control system 100B according to the present embodiment is applied. The drive system DR includes an engine 20, a torque converter 80, and a transmission 90 that is an example of a power transfer device.

The torque converter 80 is connected to the crankshaft 21 of the engine 20, and has a lockup clutch 81 and a damper 82. When the lockup clutch 81 is in an engaged state, the damper 82 is connected to the crankshaft 21 via the lockup clutch 81. Therefore, when the lockup clutch 81 is in the engaged state, the output of the engine 20 is input to an input shaft 91 of the transmission 90 via the lockup clutch 81 and the damper 82. At this time, when the engine torque fluctuates, torsional vibrations may occur in the damper 82, and a resonance caused by the torsional vibrations may occur in the input shaft 91. When such a resonance occurs in the input shaft 91, the resonance influence torque, which is the torque caused by the resonance, is input to the crankshaft 21.

The transmission 90 has a rotation position detection sensor 95 that detects a rotation angle of the input shaft 91. The rotation position detection sensor 95 outputs, to the second control device 120, a detection signal according to the rotation speed of the input shaft 91. In the present embodiment, the rotation position detection sensor 95 corresponds to the "second sensor". Further, in the present embodiment, the second sensor detects the rotation angle of the input shaft 51.

The control system 100B includes the first control device 110 and the second control device 120. The first control device 110 transmits the crank counter CNTcr to the second control device 120 via the signal line 101. Further, the control system 100B includes the CAN communication line 102 used for transmitting and receiving information between the control devices 110 and 120.

The second control device 120 receives a crank counter CNTcr from the first control device 110 via the signal line 101 as an input. Further, since the second control device 120 receives a detection signal of the rotation position detection sensor 95 as an input, the second control device 120 can acquire the input shaft rotation angle speed $\omega$inp, which is the rotation angle speed of the input shaft 51. In the present embodiment, the input shaft rotation angle speed $\omega$inp corresponds to the "transfer device side rotation angle speed". Then, the second control device 120 transmits, to the first control device 110, via the CAN communication line 102, the input shaft rotation angle speed $\omega$inp and the information acquisition timing TMd, which is the crank counter CNTcr at the time of deriving the input shaft rotation angle speed $\omega$inp.

In this case, the first control device 110 calculates the resonance influence torque Tdmp based on the input shaft rotation angle speed $\omega$inp received from the second control device 120. Since the first control device 110 receives the detection signal from the crank angle sensor 31 as an input, the first control device 110 calculates the engine inertia torque Tei. Therefore, the first control device 110 can calculate, as the engine torque Te (TMa), the sum of the resonance influence torque Tdmp (TMa) based on the input shaft rotation angle speed $\omega$inp derived at the derivation timing TMa and the engine inertia torque Tei (TMa) based on the engine rotation angle speed $\omega$e derived at the derivation timing TMa.

Modified Example

Each of the embodiments can be modified and implemented as below. Each of the above embodiments and the modified examples below can be implemented in combination with each other within a range in which no technical contradiction arises.

In the first and second embodiments, the calculated value of the output torque of the first motor generator 53 is acquired as the first motor torque Tmg1, but an applicable embodiment of the present disclosure is not limited thereto. For example, a command value of the output torque for the first motor generator 53 may be acquired as the first motor torque Tmg1.

When the first motor generator 53 is driven such that the output torque of the first motor generator 53 periodically fluctuates, the vibration frequency of the output torque may deviate from the resonance frequency of the damper 40. In this case, the amplitude of the resonance influence torque Tdmp is hardly influenced by the magnitude of the first motor torque Tmg1. For this reason, when the engine torque Te is calculated, the first motor torque Tmg1 may be omitted. Even using the engine torque Te calculated in this manner, it is possible to determine whether there is a misfire in the cylinder 22.

In the third embodiment, the resonance influence torque Tdmp is calculated by the second control device 120, and may be transmitted from the second control device 120 to the first control device 110 via the CAN communication line 102. In this case, in the same manner as in the third embodiment, it is possible to calculate the engine torque Te with high accuracy.

In the first and second embodiments, when the power transfer device 50 is provided with a sensor that detects the rotation angle of the input shaft 51 of the power transfer device 50, the rotation angle speed, which is calculated based on the output signal of the sensor, may be employed as the input shaft rotation angle speed ωinp.

Not only is the torque caused by the combustion of the air-fuel mixture input to the crankshaft 21, but also is the reciprocating inertia mass torque. When a mass body that includes the piston and a part of a connecting rod, connecting the piston and the crankshaft 21, and reciprocates in the cylinder 22 is used as a reciprocating mass body, the reciprocating inertia mass torque is a torque generated by the reciprocating motion of the reciprocating mass body in the cylinder 22. In order to further improve the accuracy of the calculation of the engine torque Te, the reciprocating inertia mass torque may be removed.

Figure 7:
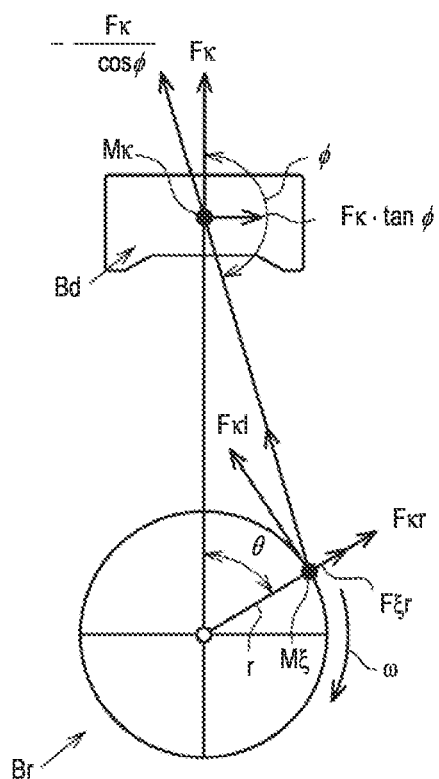
FIG. 7 is a model diagram of an engine to which a control system of a modified example is applied.

As illustrated in FIG. 7, when the mass of a reciprocating mass body Bd is a reciprocating mass Mκ, an inertia force Fκ generated by the reciprocating mass Mκ can be expressed by the following relational equation (Equation 5). In the relational equation (Equation 5), "ρ" is a reciprocal of a continuous rod ratio.

$$F\kappa = M\kappa \cdot r \cdot \omega^2 \cdot (\cos\theta + \rho \cos 2\theta) \ldots \quad \text{(Equation 5)}$$

Further, a load Fid in the tangential direction of a crank arm can be expressed as the following relational equation (Equation 6). Further, using the above relational equation (Equation 5), the relational equation (Equation 6) can be converted into the relational equation (Equation 7):

$$F\kappa 1 = -\frac{P\kappa}{\cos\varphi} \cdot \sin(\varphi - \theta) \quad \text{(Equation 6)}$$

$$F\kappa 1 = M\kappa \cdot r \cdot \omega^2 \cdot (\cos\theta + \rho \cdot \cos 2\theta) \cdot \left(\sin\theta + \frac{\rho}{2} \cdot \sin 2\theta\right) \quad \text{(Equation 7)}$$

A crank arm axial load Fκr can be expressed as the following relational equation (Equation 8):

$$F\kappa 1 = M\kappa \cdot r \cdot \omega^2 \cdot (\cos\theta + \rho \cdot \cos 2\theta) \cdot \left(\cos\theta - \frac{\rho}{2} \cdot (1 - \cos 2\theta)\right) \quad \text{(Equation 8)}$$

When a mass of a rotating body Br including the crankshaft 21 and the remaining part of the connecting rod is a rotating mass Mξ, an inertia force Fξr generated by the rotating mass Mξ can be expressed by the following relational equation (Equation 9). Then, the torque caused by the combustion of the air-fuel mixture can be derived as the engine inertia torque Tei based on this inertia force Fξr.

$$F\xi r = M\xi \cdot r \cdot \omega^2 \quad \text{(Equation 9)}$$

Figure 8:
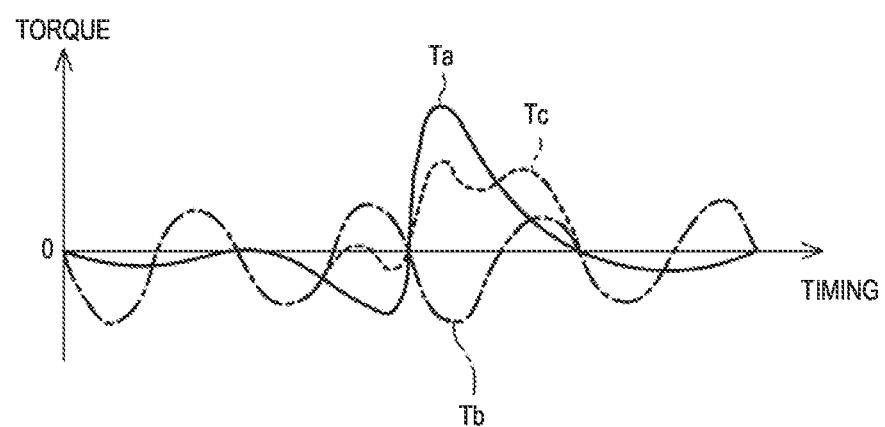
FIG. 8 is a diagram illustrating a transition of torque generated by the engine.

As such, as illustrated in FIG. 8, it is possible to acquire a torque Ta of only the rotational component of the engine 20 as the engine inertia torque Tei. In FIG. 8, a transition of a torque Tb of only a reciprocating component of the engine 20 is represented by a dash-dot-dash line, and a combined torque Tc of the torque Ta and the torque Tb is represented by a dashed line. The torque Ta corresponds to the inertia force Fξr, and the torque Tb corresponds to the inertia force Fκ. Then, it is possible to calculate a sum of the torque Ta and the torque Tb as the combined torque Tc.

In each of the above embodiments, it is not necessary to vary the derivation timing TMa. In this case, the engine does not have to be a spark ignition-type engine.

The power transfer device may have a configuration different from that of the power transfer device 50 described in the first embodiment. For example, the power transfer device may be configured to include only one motor generator.

The first control device 110 is not limited to a configuration that includes a CPU and a memory that stores a program, and executes software processing. In other words, the first control device 110 has any one of the following configurations (a) to (c).

(a) The first control device 110 includes one or more processors that execute various processes according to a computer program. The processor includes a CPU and a memory, such as a RAM and a ROM. The memory stores a program code or a command configured to cause the CPU to execute the process. A memory, that is, a computer-readable medium includes any available medium accessible by a general-purpose or dedicated computer.

(b) The first control device 110 includes one or more dedicated hardware circuits that execute various processes. Examples of the dedicated hardware circuits can include application-specific integrated circuits, that is, ASICs or FPGAs. ASIC is an abbreviation for "Application Specific Integrated Circuit", and FPGA is an abbreviation for "Field Programmable Gate Array".

(c) The first control device 110 includes a processor that executes a part of various processes according to a computer program and a dedicated hardware circuit that executes the remaining processes of the various processes.

The second control device 120 is not limited to a configuration that includes a CPU and a memory that stores a program, and executes software processing. In other words, the second control device 120 has any one of the above configurations (a) to (c).

What is claimed is:

1. A control system of a vehicle, the control system comprising:
    an engine mounted on the vehicle;
    a damper connected to a crankshaft of the engine;
    a power transfer device having an input shaft that is connected to the damper and a rotating body that rotates in synchronization with the input shaft;
    a first sensor configured to detect a rotation angle of the crankshaft;
    a second sensor configured to detect a rotation angle of the input shaft or the rotating body;
    a first control device configured to receive a detection signal of the first sensor as an input; and
    a second control device configured to receive a detection signal of the second sensor as an input and to communicate with the first control device, wherein:
    the second control device is configured to execute:
    a transfer device side rotation angle speed acquisition process for acquiring, based on the detection signal of the second sensor, a rotation angle speed of the input shaft or the rotating body as a transfer device side rotation angle speed; and
    a transmission process for transmitting, to the first control device, a resonance influence torque or the transfer device side rotation angle speed, and an information acquisition timing, which is an acquisition timing of the transfer device side rotation angle speed, the resonance influence torque being torque caused by a resonance occurring in the power transfer device and calculated based on the transfer device side rotation angle speed;

the first control device is configured to execute:

a rotation angle speed derivation process for deriving, based on the detection signal of the first sensor, a rotation angle speed of the crankshaft as an engine rotation angle speed;

an inertia torque calculation process for calculating an engine inertia torque based on the engine rotation angle speed; and an engine torque calculation process for calculating a sum of the resonance influence torque and the engine inertia torque as an engine torque, which is an output torque of the engine; and the first control device is configured to, in the engine torque calculation process:

select the resonance influence torque based on the transfer device side rotation angle speed, which is acquired at a predetermined derivation timing, based on the information acquisition timing received from the second control device; and calculate, as the engine torque, the sum of the resonance influence torque and the engine inertia torque which is calculated based on the engine rotation angle speed derived at the derivation timing.

2. The control system according to claim 1, wherein:

the engine is a spark ignition-kind engine; and the first control device is configured to, when an ignition timing of the engine is advanced, execute a derivation timing adjustment process for bringing forward the derivation timing.

3. The control system according to claim 1, wherein:

the second control device is configured to:

execute a resonance influence torque calculation process for calculating, based on the transfer device side rotation angle speed, the resonance influence torque; and transmit, in the transmission process, to the first control device, the resonance influence torque and the information acquisition timing, which is the acquisition timing of the transfer device side rotation angle speed used for calculating the resonance influence torque.

4. The control system according to claim 1, wherein:

the power transfer device has a motor generator;

a rotor of the motor generator is the rotating body that rotates in synchronization with the input shaft;

the second sensor is configured to detect a rotation angle of the rotating body;

the second control device is configured to acquire, in the transfer device side rotation angle speed acquisition process, the rotation angle speed of the rotating body as the transfer device side rotation angle speed and transmit, in the transmission process, to the first control device, a motor torque, which is an output torque of the motor generator, the rotation angle speed of the rotating body, the rotation angle speed of the input shaft, and the information acquisition timing, which is an acquisition timing of the rotation angle speed of the rotating body; and the first control device is configured to execute the resonance influence torque calculation process for calculating the resonance influence torque based on the motor torque, the rotation angle speed of the rotating body, and the rotation angle speed of the input shaft received from the second control device.

5. The control system according to claim 4, wherein the second control device is configured to execute a motor torque acquisition process for acquiring, as the motor torque, a calculated value of the output torque of the motor generator based on a motor current value, which is a value indicating current flowing through the motor generator.

* * * * *